United States Patent [19]

Takahashi

[11] Patent Number: 4,730,838
[45] Date of Patent: Mar. 15, 1988

[54] MOTOR VEHICLE WITH LEVELING MECHANISMS

[75] Inventor: Hirotake Takahashi, Saitama, Japan

[73] Assignee: Honda Giken Kogyo Kabushiki Kaisha, Tokyo, Japan

[21] Appl. No.: 898,125

[22] Filed: Aug. 19, 1986

[30] Foreign Application Priority Data

Aug. 21, 1985 [JP] Japan ............................ 60-127479[U]

[51] Int. Cl.⁴ ........................ B60G 17/00; B62D 17/00
[52] U.S. Cl. .................................... 280/6 R; 280/688; 280/702; 280/661
[58] Field of Search .............. 280/6 R, 6 H, 707, 708, 280/709, 702, 661, 711

[56] References Cited

U.S. PATENT DOCUMENTS

| | | | |
|---|---|---|---|
| 3,374,848 | 3/1968 | Castelet | 280/6 R |
| 4,324,416 | 4/1982 | Scheeweiss | 280/661 |
| 4,364,574 | 12/1982 | Saito | 280/6 R |
| 4,396,202 | 8/1983 | Kami et al. | 280/6 R |
| 4,483,546 | 11/1984 | Brearley | 280/6 R |
| 4,568,101 | 2/1986 | Bleustein et al. | 280/707 |
| 4,592,439 | 6/1986 | Collard et al. | 280/6 R |
| 4,641,854 | 2/1987 | Masuda et al. | 280/688 |

Primary Examiner—Richard A. Bertsch
Attorney, Agent, or Firm—Irving M. Weiner; Joseph P. Carrier; William D. Blackman

[57] ABSTRACT

A four-wheel motor vehicle has a frame assembly, a pair of steerable front wheels, a pair of rear wheels, and leveling mechanisms. The four-wheel motor vehicle includes front wheel supporting means angularly movably mounted on the frame assembly and supporting the front wheels, the front wheels being supported at a positive caster angle by the front wheel supporting means when the front wheel supporting means is held at an angle to the frame assembly, rear wheel supporting means angularly movably mounted on the frame assembly and supporting the rear wheels, at least one damper interconnected between the frame assembly and the front wheel supporting means, and at least one damper interconnected between the frame assembly and the rear wheel supporting means. The leveling mechanisms are combined with the dampers for adjusting distances between the frame assembly and the front and rear wheel supporting means when the dampers are inoperative.

6 Claims, 8 Drawing Figures

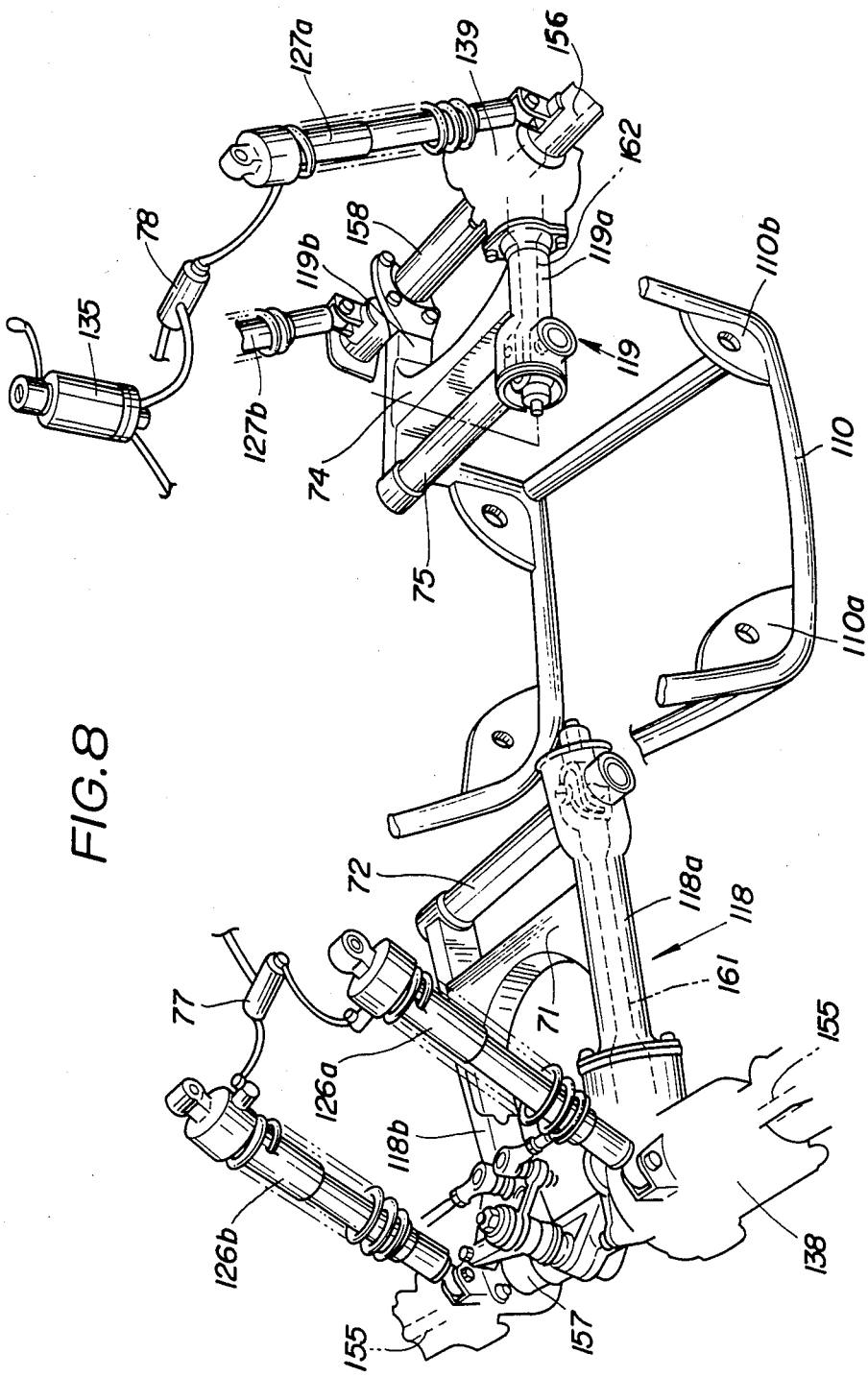

MOTOR VEHICLE WITH LEVELING MECHANISMS

BACKGROUND OF THE INVENTION

The present invention relates to a motor vehicle having leveling mechanisms for adjusting the height of the motor vehicle.

SUMMARY OF THE INVENTION

According to the present invention, there is provided a four-wheel motor vehicle including a frame assembly, a pair of steerable front wheels, a pair of rear wheels, front wheel supporting means angularly movably mounted on the frame assembly and supporting the front wheels, the front wheels being supported at a positive caster angle when the front wheel supporting means is held at an angle to the frame assembly, rear wheel supporting means angularly movably mounted on the frame assembly and supporting the rear wheels, at least one damper interconnected between the frame assembly and the front wheel supporting means, at least one damper interconnected between the frame assembly and the rear wheel supporting means, and leveling mechanisms combined with the dampers, respectively, for adjusting distances between the frame assembly and the front and rear wheel supporting means.

It is an object of the present invention to provide a motor vehicle having leveling mechanisms for adjusting the height of the motor vehicle and allowing a steering handle to be manipulated with small forces when the height of the motor vehicle is increased.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 8 is a view similar to FIG. 2, showing another embodiment of the present invention.

DETAILED DESCRIPTION OF THE PREFERRED EMBODIMENTS

Figure 1:
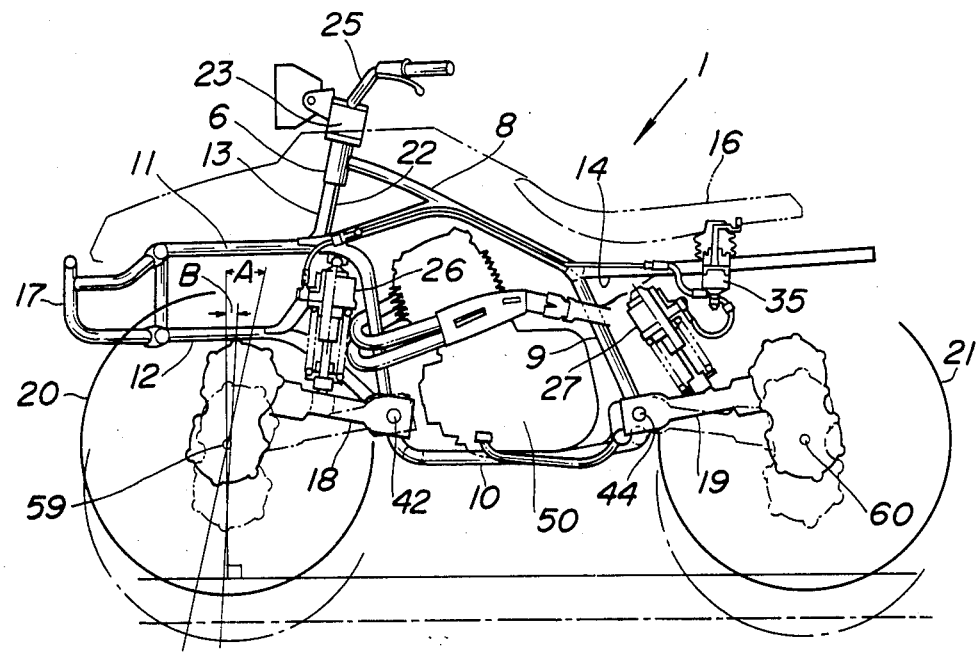
FIG. 1 is a side elevational view of a motor vehicle with a riding saddle showing the relationship between a frame structure and dampers with leveling mechanisms according to the present invention.

As shown in FIG. 1, a motor vehicle 1 with a riding saddle has a frame assembly including a head pipe 6, a main frame 8 extending rearwardly from the head pipe 6, a central frame 9 extending downwardly from the rear end of the main frame 8, and a lower frame 10 extending forwardly from the lower end of the central frame 9 and supporting an engine 50 substantially centrally in a longitudinal direction of the frame assembly. Front upper and lower frames 11, 12 extend forwardly from the front ends of the lower frame 10, the front upper frame 11 being joined to the head pipe 6 by a connector pipe 13.

Figure 2:
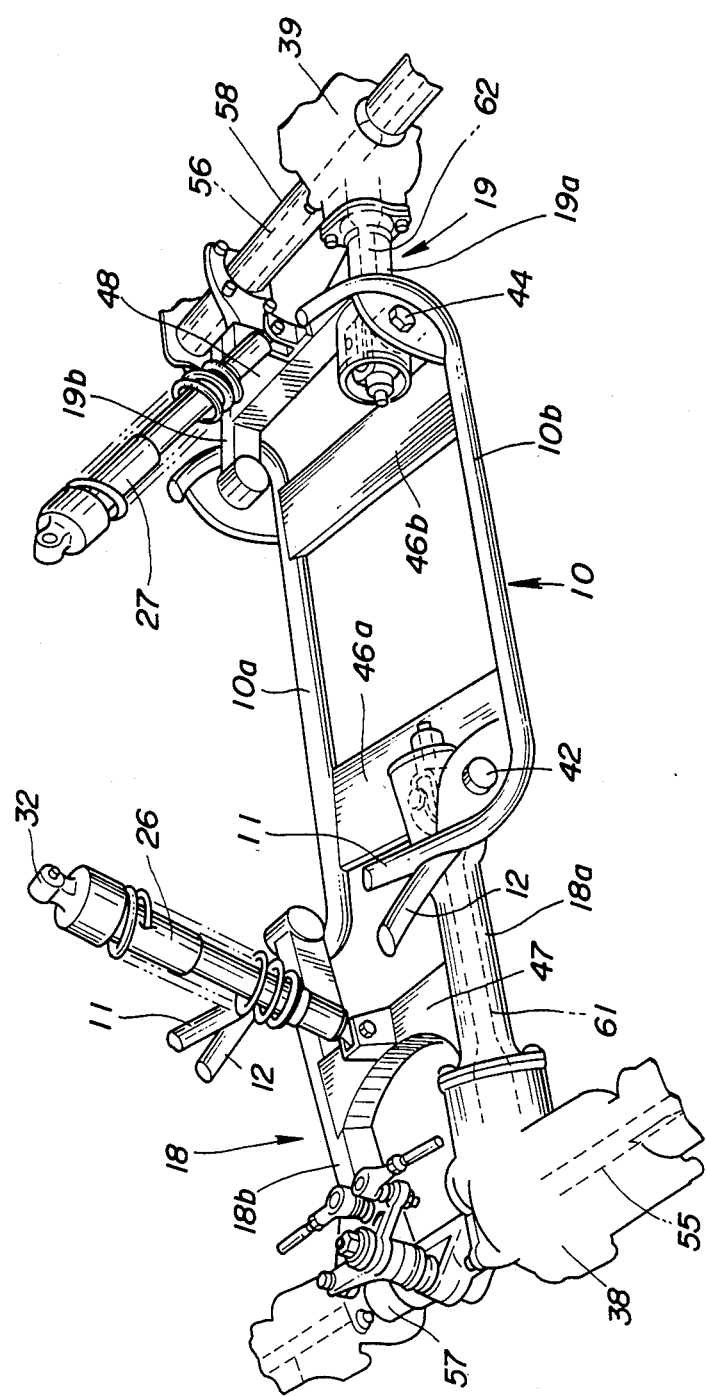
FIG. 2 is a fragmentary perspective view of a lower frame, a front leading swing arm, a rear trailing swing arm, and damper with leveling mechanisms according to the present invention.

A seat rail 14 extends rearwardly from the rear end of the main frame 8 and supports thereon a driver's seat or saddle 16. A bumper support frame 17 is interconnected between and projects forwardly from the front ends of the front upper and lower frames 11, 12. Each of the main frame 8, the central frame 9, the front upper frame 11, and the front lower frame 12 comprises a pair of laterally spaced frame members which are connected to each other by means of reinforcing cross members, not shown. As illustrated in FIG. 2, the lower frame 10 comprises a pair of laterally spaced frame members 10a, 10b which are connected to each other by a pair of reinforcing cross members 46a, 46b.

A front leading swing arm 18 extends forwardly from the front end of the lower frame 10 and is angularly movably mounted thereby by a pivot 42. Similarly, a rear trailing swing arm 19 extends rearwardly from the rear end of the lower frame 10 and is angularly movably mounted thereon by a pivot 44.

The leading swing arm 18 comprises a pair of transversely spaced arm members 18a, 18b and a cross member 47 extending between and joined to the arm members 18a, 18b. The trailing swing arm 19 comprises a pair of transversely spaced arm members 19a, 19b and a cross member 48 extending between and joined to the arm members 19a, 19b. Drive shafts 61, 62 for driving front and rear wheels, respectively, extend through the arm members 18a, 19a, respectively, and final gear boxes 38, 39 are coupled to the distal ends of the arm members 18a, 19b, respectively. Final output shafts 55, 56 extend transversely through the final gear boxes 38, 39, respectively, the final output shafts 55, 56 being operatively coupled to the drive shafts 61, 62, respectively, through gears (not shown). The final output shafts 55, 56 are accommodated respectively in housings 57, 58 which are supported by the distal ends of the arm members 18b, 19b, and gear boxes 38, 39 respectively.

As shown in FIG. 1, a steering shaft 22 is rotatably supported in the head pipe 6 and has an upper end fixed to a handle holder 23 to which a steering handlebar 25 is secured. Front wheels 20 can be steered by the handlebar 25 through the steering shaft 22.

Figure 3:
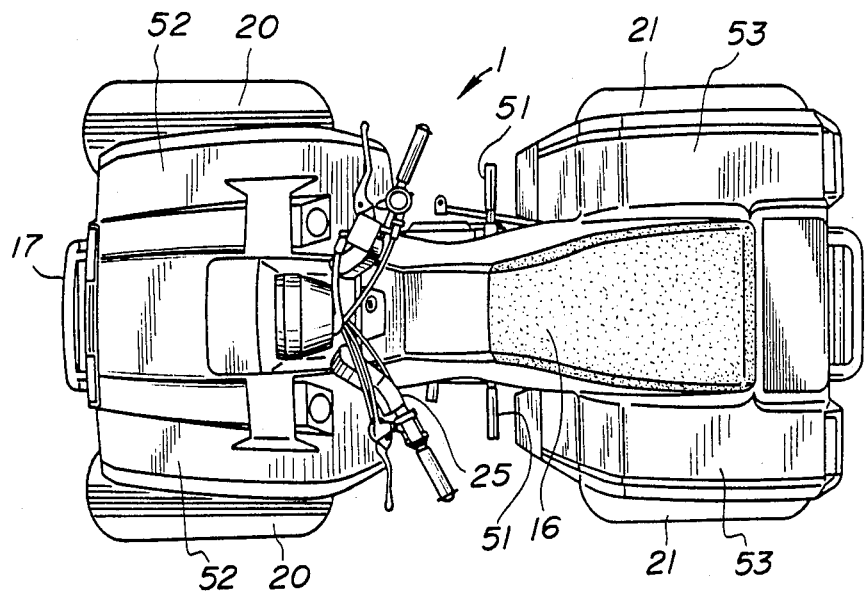
FIG. 3 is a plan view of a four-wheel motor vehicle with a riding saddle according to the present invention.
Figure 4:
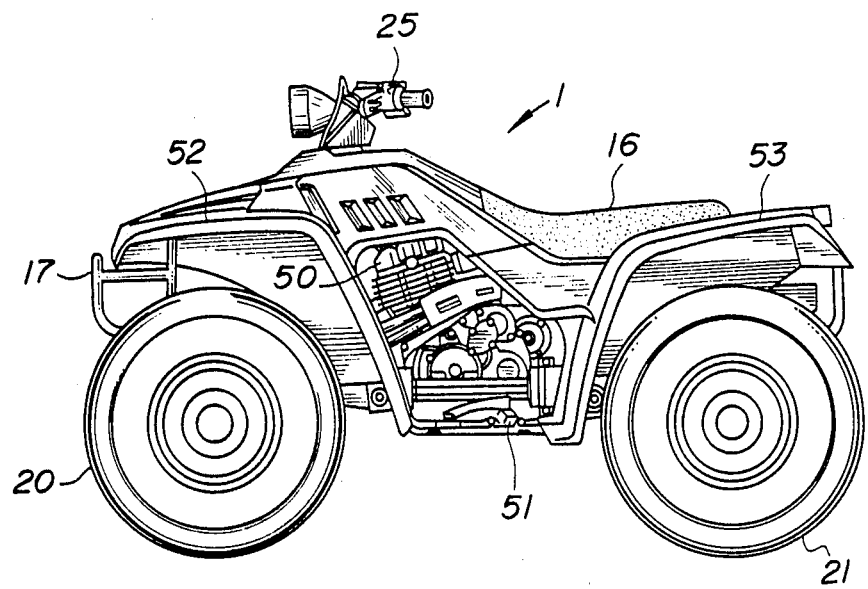
FIG. 4 is a side elevational view of the fourwheel motor vehicle shown in FIG. 3.

As illustrated in FIGS. 3 and 4, the motor vehicle 1 also includes a pair of foot steps 51, a pair of front fenders 52 overlying the front wheels 20, and a pair of rear fenders 53 overlying rear wheels 21.

In FIG. 1, a damper 26 with a leveling mechanism is connected between the cross member 47 extending between leading arm members 18a, 18b and a cross member (not shown) extending between and joined to the frame members of the front upper frame 11. Another damper 27 with a leveling mechanism is connected between the cross member 48 extending between trailing arm members 19a, 19b and a cross member (not shown) extending between and joined to two laterally spaced rail members of the seat rail 14.

Figure 5:
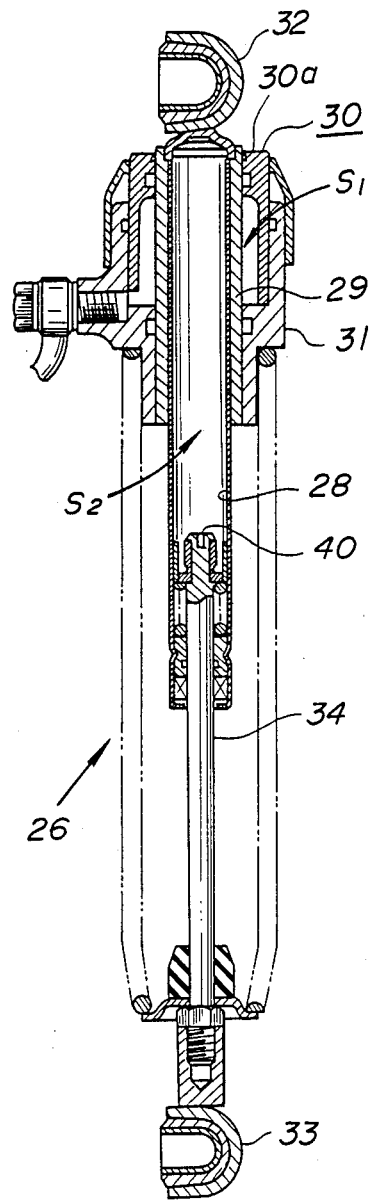
FIG. 5 is a vertical cross-sectional view of the damper with the leveling mechanism.

As shown in FIG. 5, the damper 26 includes an inner cylinder 28 having an end portion fitted in an outer sleeve 29, an outer cylinder 30 having a head 30a fixed to an upper end portion of the outer sleeve 29, and a spring seat 31 slidably mounted on the outer sleeve 29 and the outer cylinder 30. The spring seat 31 and the outer cylinder 30 jointly define an oil chamber S1 around the outer periphery of the outer sleeve 29, the oil chamber S1 being filled with oil for leveling the motor vehicle 1. A piston 40 secured to an upper end of a piston rod 34 is slidably disposed in the inner cylinder 28 and defines therein an oil chamber S2 filled with dampening oil. When the piston 40 is vertically moved in the inner cylinder 28, the dampening oil generates dampening forces. An upper bracket 32 is mounted on the upper end of the inner cylinder 28, and a lower bracket 33 is mounted on the lower end of the rod 34. The upper bracket 32 is connected to the non-illustrated cross member between the frame members of the front upper frame 11. The lower bracket 33 is connected to the cross member 47 between the leading arm members 18a, 18b. A leveling mechanism comprises the outer sleeve 29, the outer cylinder 30, the spring seat 31, and the oil chamber S1.

The damper 27 is of a construction identical to that of the damper 26. The damper 27 has an upper bracket connected to the non-illustrated cross member between the rail members of the seat rail 14 and a lower bracket connected to the cross member 48 between the trailing arm members 19a, 19b.

Figure 6:
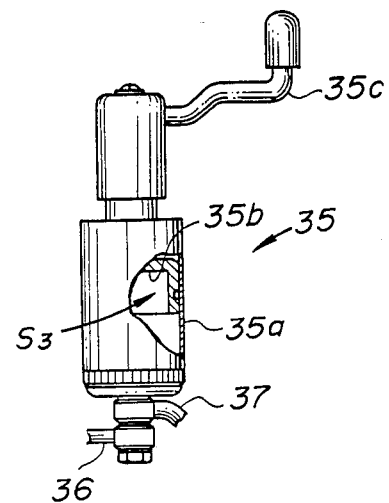
FIG. 6 is a side elevational view, partly cut away, of an oil pressure controller for the leveling mechanism.

FIG. 6 shows an oil controller 35 for regulating oil comprising a cylinder 35a and a piston 35b slidably disposed in the cylinder 35a, there being an oil chamber S3 defined in the cylinder 35a by the piston 35b. The oil chamber S3, which is filled with oil, communicates with the oil chambers S1 of the dampers 26, 27 through tubes 36, 37, respectively. The piston 35b is operatively coupled to a handle 35c. When the handle 35c is turned, the piston 35b is vertically moved in the cylinder 35a. Upon downward movement of the piston 35b, oil is forced from the oil chamber S3 to flow through the tubes 36, 37 into the oil chambers S1 of the dampers 26, 27. As the piston 35b is moved upwardly, oil flows from the oil chambers S1 of the dampers 26, 27 through the tubes 36, 37 into the oil chamber S3 of the oil controller 35.

Under a normal condition indicated by the solid lines in FIG. 1, the outer cylinder 30 of each of the dampers 26, 27 is lowered into the spring seat 31, reducing the height of the motor vehicle 1. When the motor vehicle 1 is to run over rough terrain, or other needs arise, the handle 35c of the oil controller 35 is turned to lower the piston 35b for thereby forcing oil into the oil chambers S1 of the dampers 26, 27. The outer cylinder 30, the inner cylinder 28, and the outer sleeve 29 of each of the dampers 26, 27 is moved upwardly with respect to the spring seat 31 to increase the overall length of the dampers 26, 27. Therefore, the distance between the leading arm 18 and the front upper frame 11 and also between the trailing arm 19 and the seat rail 14 is increased, thus increasing the height of the motor vehicle 1 as indicated by the imaginary lines in FIG. 1.

The front wheels 20 are supported on the front end of the leading arm 18 and inclined at a positive caster angle. The caster angle varies as the leading arm 18 is angularly moved about the pivot 42. For example, when the length of the damper 26 is increased by the leveling mechanism, the leading arm 18 is angularly moved counterclockwise (FIG. 1) about the pivot 42 from the solid-line position in FIG. 1 to the imaginary-line position in FIG. 1, increasing the height of the motor vehicle 1. At this time, the caster angle of the front wheels 20 is reduced from A to B (FIG. 1). As the caster angle is reduced, the resistance which the front wheels 20 suffer from the road when the handlebar 25 is turned is also reduced. As a consequence, when the height of the motor vehile 1 is increased for travel over bumpy terrain, for example, the front wheels 20 can easily be steered under reduced forces.

Figure 7:
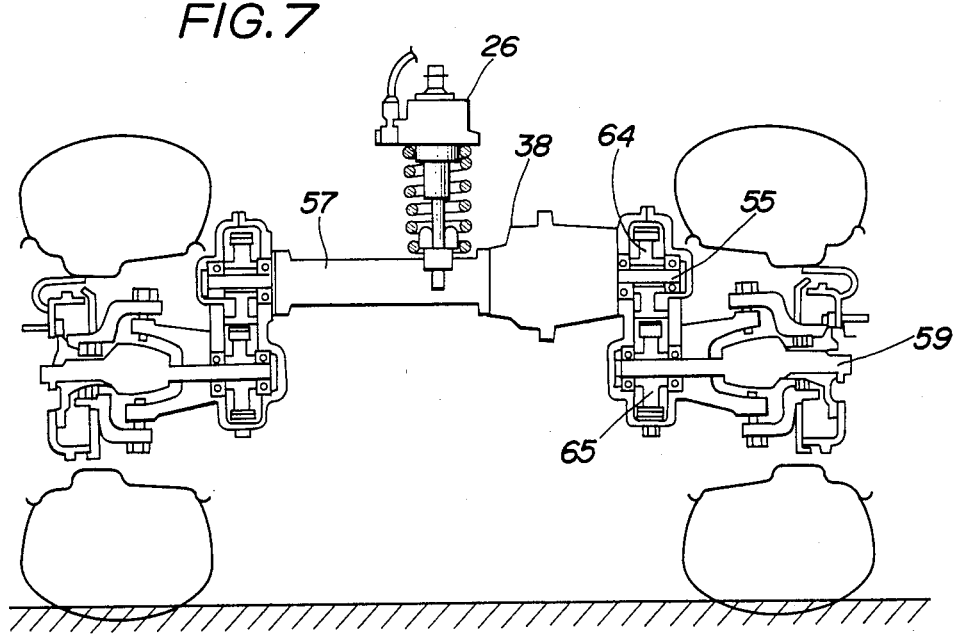
FIG. 7 is a sectional front elevational view of speed reducer mechanisms for front wheels.

The final output shafts 55, 56 are operatively coupled to axles 59, 60 (FIG. 1) through hub gears to keep the output shafts 55, 56 at a desired height from the ground. More specifically, as shown in FIG. 7, the final output shaft 55 extending through the final gear box 38 is operatively coupled to the axles 59 of the front wheels 20 through speed reducer gears 64, 65. This arrangement keeps the final output shaft 55 at a desired height from the ground. The final output shaft 56 for the rear wheels 21 is similarly connected by speed reducer gears to the axles 60.

FIG. 8 shows another embodiment of the present invention in which two dampers with leveling mechanisms are connected to a front leading swing arm which supports front wheels and two dampers with leveling mechanisms are connected to a rear trailing swing arm which supports rear wheels.

A front leading swing arm 118 comprises two transversely spaced arm members 118a, 118b and two cross members 71, 72 extending between and joined to the arm members 118a, 118b. Likewise, a rear trailing swing arm 119a comprises two transversely spaced arm members 119a, 119b and two cross members 74, 75 extending between and joined to the arm members 119a, 119b. A drive shaft 161 extends through the leading arm member 118a, whereas a drive shaft 162 extends through the trailing arm member 119a. Final gear boxes 138, 139 are coupled respectively to distal ends of the arm members 118a, 119a. To distal ends of the other arm members 118b, 119b, there are coupled housings 157, 158, respectively, of final output shafts 155, 156 extending transversely through the final gear boxes 138, 139. Two transversely spaced dampers 126a, 126b are associated with front wheels (not shown). The damper 126a is mounted on the final gear box 138, and the damper 126b is mountd on the output shaft housing 157 near the distal end of the leading arm member 118b. Similarly, two dampers 127a, 127b are associated with rear wheels (not shown) and spaced from each other by a distance larger than the distance between the dampers 126a, 126b. The dampers 127a, 127b are mounted on the output shaft housing 158. Each of the dampers 126a, 126b, 127a, 127b is structurally identical to the damper 26 shown in FIG. 5. The dampers 126a, 126b have oil chambers communicating with a common oil joint 77, whereas the dampers 127a, 127b have oil chambers communicating with a common oil joint 78. The oil joints 77, 78 are held in communication with an oil controller 135.

The principles of the present invention have been shown and described as being incorporated in a four-wheel motor vehicle with a riding saddle. However, the present invention is not limited to such a motor vehicle, but is also applicable to other types of motor vehicles.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

I claim:

1. A four-wheeled motor vehicle comprising:
   a frame assembly;
   a pair of steerable front wheels;
   a pair of rear wheels;
   front wheel supporting means angularly movable mounted on a lower portion of said frame assembly and supporting said front wheels, said front wheel supporting means comprising a leading swing arm and said front wheels being supported at a positive caster angle when said front wheel supporting means is held at an angle to said frame assembly;
   rear wheels supporting means angularly movably mounted on said frame assembly and supporting said rear wheels;
   at least one damper interconnected between an upper portion of said frame assembly and said front wheel supporting means;
   at least one damper interconnected between said frame assembly and said rear wheel supporting means; and
   leveling mechanisms combined with said dampers, respectively, for adjusting distances between said frame assembly and said front and rear wheel supporting means and for reducing the positive caster angle at which said front wheels are supported by increasing the length of said dampers.

2. A four-wheel motor vehicle according to claim 1, wherein said leading swing arm includes a pair of arm members pivotally supported on said frame assembly and at least one cross member extending between and joined to said arm members.

3. A four-wheel motor vehicle according to claim 1, wherein a single damper is interconnected between said frame assembly and said front wheel supporting means.

4. A four-wheel motor vehicle according to claim 1, wherein two spaced dampers are interconnected between said frame assembly and said front wheel supporting means.

5. A four-wheel motor vehicle according to claim 1, further including an engine mounted substantially centrally in said frame assembly in a longitudinal direction thereof, said rear wheel supporting means comprising a trailing swing arm pivotally supported on said frame assembly rearwardly of said engine, said front wheel supporting means being pivotally supported on said frame assembly forwardly of said engine.

6. A four-wheel motor vehicle according to claim 1, further including a controller means for controlling said leveling mechanisms, said controller means being exclusively manually driven by an operator of said vehicle.

* * * * *

UNITED STATES PATENT AND TRADEMARK OFFICE
CERTIFICATE OF CORRECTION

PATENT NO. : 4,730,838

DATED : MARCH 15, 1988

INVENTOR(S) : Hirotake TAKAHASHI

It is certified that error appears in the above-identified patent and that said Letters Patent is hereby corrected as shown below:

Column 1, line 50, change "fourwheel" to --four-wheel--.
Column 4, line 4, change "vehile" to --vehicle--.

Signed and Sealed this

Ninth Day of August, 1988

Attest:

DONALD J. QUIGG

Attesting Officer

Commissioner of Patents and Trademarks